United States Patent Office 2,883,348
Patented Apr. 21, 1959

2,883,348

PRODUCTION OF TITANIUM ESTERS

Alphonse Pechukas, Pittsfield, Mass., assignor to Columbia-Southern Chemical Corporation, Allegheny County, Pa., a corporation of Delaware No Drawing. Application December 16, 1954
Serial No. 475,829

2 Claims. (Cl. 260—2)

This invention relates to a novel resinous composition of matter. According to the present invention, it has been found that a novel resinous product can be prepared by reacting together a titanium tetrahalide and a polyepoxide. By the term "polyepoxide" is meant a compound which contains two or more epoxy groups in which the oxygen atoms of the epoxy groups are linked to adjacent carbon atoms and which therefore contain at least two of the groups:

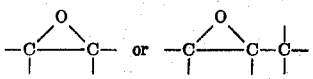

in which the two carbon atoms to which the oxygen atom is linked are linked to groups other than acidic OH groups. These epoxides are referred to hereinafter as 1,2-epoxides.

The resins thus obtained may be regarded as resinous esters of orthotitanic acid and glycols having a halogen atom or a chlorine atom linked directly to a carbon atom immediately adjacent to each of the alcoholic

groups of the glycol. Thus, the resinous esters have the structure:

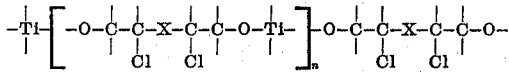

and

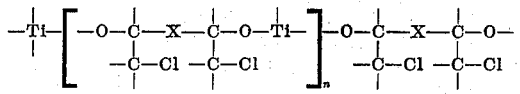

The epoxides herein contemplated may be prepared by subjecting compounds which contain two or more ethylenically unsaturated groups to epoxidation under conditions such as to epoxidize at least two of the unsaturated groups. Since the epoxides are conventionally prepared from unsaturated compounds, it is convenient to designate the epoxides in terms of the unsaturated compounds from which they have been or can be derived. For example, since the compound

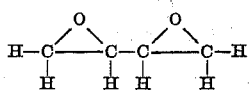

can be derived from butadiene-1,3, it is conventionally known as butadiene epoxide.

The resins herein contemplated may be prepared from various polyepoxides such as the di- or polyepoxides obtained from butadiene-1,3, isoprene, cyclopentadiene, butadiene dimer, divinyl benzene, dicyclopentadiene or polycyclopentadiene. In most cases the two epoxy groups are linked together through a carbon chain. Such compounds produce materials which are less subject to hydrolysis. However, it is also possible to make use of epoxides in which the epoxy groups are separated by an ester linkage. Thus, the diepoxide of glycidyl 3,4-epoxy butyrate or diglycidyl phthalate, diglycidyl maleate, diglycidyl succinate or the di- or polyepoxy compounds obtained by condensation of bis phenol A (condensation product of acetone with phenol) with epichlorohydrin, or the phenyl polyglycidyl ethers and the polyglycidyl ethers of bis phenol A, or the like also may be used to produce resinous products in accordance with the present invention.

The resins herein contemplated may be prepared by reaction of titanium tetrahalide, such as titanium tetrachloride, with the epoxide. The reaction apparently proceeds according to the following equation:

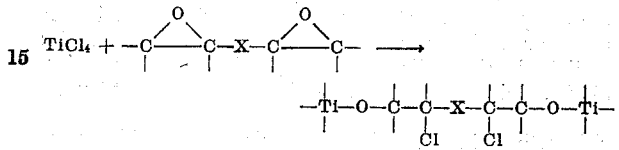

and/or

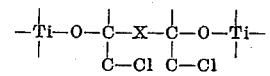

and/or

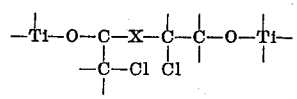

where X is the group which links the epoxy groups together. Thus, the overall reaction proceeds according to the general equation:

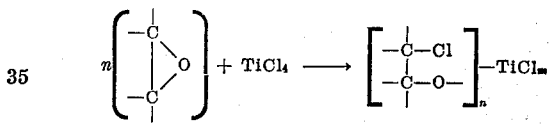

where $n$ is a small whole number not less than 2 nor more than 4, $m$ is equal to $4-n$, and where

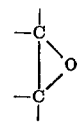

represents the epoxy groups of the epoxy compound.

According to a further embodiment, polyhalotitanates having the structure:

$$[R-O]_m TiCl_n$$

where R is a radical of a monohydric alcohol ROH and $m$ plus $n$ equals 4, $m$ being 1 or 2 and $n$ being 2 or 3, may be reacted with polyepoxides to produce resinous products.

According to a further embodiment of the invention, mixed polyepoxides can be prepared using partial esters of titanium tetrachloride having the formula:

$$[R-O]_m TiCl_n$$

where R is a monovalent radical of the titanate ester, usually derived from a monohydric alcohol ROH and the sum of $m$ plus $n$ is 4, $m$ being 1 or 2 and $n$ being 2 or 3. Normally, R contains no more than 10 carbon atoms.

Saturated esters which may be used according to this embodiment may include: 2-chloroethyl titanium trichloride, ethyl titanium trichloride, n-propyl titanium trichloride, stearyl titanium trichloride, phenyl titanium trichloride, bis(2-chloroethyl) titanium dichloride, diethyl titanium trichloride, dibutyl titanium dichloride, ethyl 2-chloroethyl titanium dichloride, distearyl titanium dichloride, diphenyl titanium dichloride, and the corresponding bromides, iodides, and fluorides, as well as the corresponding compounds in which hydrogen atoms are substituted by halogen, $NO_3$, alkoxy groups, phenyl groups, and the like.

According to a particularly advantageous embodiment of the invention, a resinous material which is further polymerizable by virtue of the unsaturated groups can be produced using chlorotitanates of unsaturated alcohols. These include chlorotitanates having the formula:

$$[R_1\!-\!O\!-\!]_m\!-\!TiCl_n$$

where $m$ is 1 or 2, $n$ is 2 or 3, and $R_1$ is an unsaturated monovalent radical, preferably containing no more than 10 carbon atoms and containing the polymerizable group C=C. Thus, as herein contemplated, R may be an allyl, 2-chloroallyl, methallyl, crotyl, cinnamyl, oleyl, linoleyl, cyclopentadienyl or propargyl group, or the like. Thus, the compounds which may be reacted with diepoxides in accordance with this embodiment of the invention include: diallyl titanium dichloride, allyl titanium trichloride, oleyl titanium trichloride, 2-chloro 3,4-butenyl titanium trichloride, bis(2-chloroallyl) titanium dichloride, allyl 2-chloroethyl titanium dichloride, cinnamyl 2-chloroethyl titanium dichloride, and the corresponding other halides.

The terms "polyhalotitanate" and "polychlorotitanate," as used herein, are intended to include titanium tetrahalide and titanium tetrachloride, respectively, as well as the organic derivatives thereof, in which one or two of the halogen or chlorine atoms are replaced by the group OR where R is a monovalent organic radical. The terms "organic halotitanate" and "organic chlorotitanate" mean the compounds in which the halogen or chlorine atoms of titanium tetrachloride are replaced by OR groups where R is a monovalent organic group. Thus, the prefix "poly" refers to the halogen or chlorine atoms, i.e., the compounds contain two or more chlorine or halogen atoms attached directly to a titanium atom.

The proportion of titanium chloride to polyepoxide should, for most cases, be in the proportion of about 0.25 to 2 chlorine or like halogen atoms attached directly to the titanium atom of the titanium chloride per epoxy group of the polyepoxide. Best results are achieved when the ratio of such chloro or halo groups to epoxy groups is substantially one plus or minus 25 percent.

The production of these esters is accomplished by mixing the epoxide with the titanium tetrachloride or other titanium tetrahalide at a temperature usually below 25° C., preferably below 10° C. Inert solvents, such as carbon tetrachloride or methylene chloride or other substantially inert chlorohydrocarbon solvents, are normally used in order to prevent overheating and in order to prevent more ready control of the reaction.

The resins produced according to the present invention are high molecular weight materials which may be either soluble or insoluble in usual solvents. Where a dihalotitanate, such as ethyl butenyl titanium dichloride or dibutenyl titanium dichloride, is used and such ester is reacted with a diepoxide, the product is a long chain ester of the two-dimensional type having the general structure:

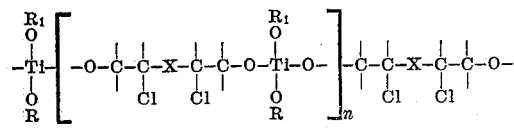

In such a case, the resulting ester normally is a fusible solid or high boiling liquid which is readily soluble in chlorinated solvents, such as methylene chloride and chloroform, although it may have relatively poor solubility in so-called oxygenated solvents such as ether and alcohols. This product is further polymerizable by virtue of the presence of the unsaturated groups. Thus, the product may be further cured to an infusible state by introducing peroxide catalyst into the mixture in the proportion of approximately 0.1 to 5 percent by weight of the catalyst, based upon the resin, and heating the product at a convenient temperature, depending upon the effective temperature at which the peroxide functions. For example, with benzoyl peroxide, heating can be conducted at a temperature ranging from 70 up to 105° C. With tertiary butyl peroxide, a lower temperature can be used. With acetone peroxide, higher temperatures must be used.

The above described resins may be prepared in admixture with other resins and resin-forming materials. Notably, the unsaturated two-dimensional unsaturated resins derived from the unsaturated dihalotitanates and diepoxides may be mixed with polymerizable unsaturated liquids containing a polymerizable aliphatically unsaturated carbon-carbon group, such as styrene, methyl methacrylate, acrylonitrile, diallyl phthalate, propylene glycol maleate or the like, and the mixture polymerized by heating with peroxide under ultraviolet light and/or in air to form copolymers. The other titanium resins described above may be copolymerized in a similar way.

The resins herein described may be used to impregnate various types of fibrous materials as, for example, fibrous glass cloth, asbestos, cotton fabrics, and the like, and, after impregnation, the sheets may be laminated and shaped to a desired contour and further polymerized. Thus, the herein contemplated resins may be used generally in the same processes which are conventionally in use in the polymerization of glycol phthalate-maleate products such as are described in U.S. Patent No. 2,593,787, granted April 22, 1952. These resins in their partially or completely cured state also may be used as coating agents for coating metal, wood, fabric or the like, and as modifiers for other resins.

The following examples are illustrative:

*Example 1*

A solution of one volume of titanium tetrachloride to two volumes of methylene chloride is cooled to 5° C. in dry air. Ethylene oxide in the proportion of 1.92 parts by weight to 8.65 parts by weight of titanium tetrachloride is added dropwise to the solution and the solution is stirred vigorously while maintaining the solution temperature at about 5° C.

The resulting yellow solution containing 2-chloro ethyl titanium trichloride is then allowed to warm to room temperature for several hours. Thereafter, it is cooled to 5° C. and 3.2 parts by weight of 1,2-epoxybutene-3, dissolved in 10 volumes of methylene chloride per 3.7 volumes of epoxybutene, is added dropwise with cooling and stirring to the solution. During the addition the resulting titanate solution becomes brilliant green. When the addition is complete, the mixture is allowed to warm to room temperature for several hours. The product thus obtained is the 2-chloroethyl 2-chloro-n-butenyl titanium dichloride having the structure:

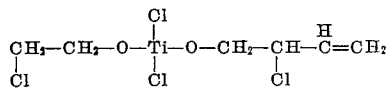

Copolymers of the above product are produced by mixing 50 parts by weight of such resinous titanium ester with 5 to 200 parts by weight of monomeric styrene, methyl methacrylate, vinyl acetate, vinyl chloride or the like, and heating the mixture to 70–100° C. in the presence of a peroxide catalyst.

Similar products are produced when any of the following diepoxides are used in equivalent amounts in lieu of the diepoxybutane: diglycidyl ether of phenol, the polyepoxy condensation product of epichlorohydrin and bis phenol A, glycidyl 3,4-epoxybutyrate, and butadiene dimer diepoxide.

A solution of freshly distilled 1,2,3,4-diepoxybutane containing 3.5 volumes of diepoxybutane to 10 volumes of methylene chloride is prepared. A quantity of this solution containing 6.25 parts by weight of the diepoxybutane is added to the green solution while maintaining the mixture at a temperature of about 5° C. During this addition a slight red tint appears and the intensity of the green of the titanate solution diminishes. After the addition is complete, titrations of small samples thereof indicate the presence of but negligible amounts of chloride ion, thus showing that the addition is substantially complete.

The resulting dark colored solution is heated to 100° C. to distill off solvent and a viscous liquid which solidifies to a brown colored solid is obtained. This solid which is a mixed alkyd type titanate ester of the corresponding dichlorobutylene glycol, beta-chloroethyl alcohol, and chlorobutenol, is a brittle solid which is readily ground to a powder and is soluble in methylene chloride and chloroform and almost insoluble in ether and ethyl alcohol.

Films of this resin, formed by coating a surface with a chloroform solution and drying the coating at room temperature and allowing the film to cure at room temperature for two weeks, become insoluble in chloroform and other solvents and have good water resistance. The soluble resin also cures to an insoluble state upon heating for 16 hours at 70° C.

Example II

The process of Example I is performed using 3.1 parts by weight of butadiene monoxide in lieu of 1.92 parts by weight of ethylene oxide. The resulting product polymerizes to an insoluble state more readily than the product of Example I.

Example III

A solution of 3.5 volumes of 1,2,3,4-diepoxybutane in 10 volumes of methylene dichloride is prepared. Titanium tetrachloride is slowly added to this solution while holding the temperature of the solution at about 5° C. After about 0.25 mole of titanium tetrachloride per mole of the diepoxy compound has been added, the solution gradually increases in viscosity. Addition of TiCl₄ is continued until about 0.4 to 0.45 mole of TiCl₄ per mole of diepoxy compound has been added. Thereupon, the temperature of the mixture is allowed to rise to room temperature. A suitable base, e.g. fabric, wood or metal, is coated with the resulting mixture and the solvent vaporized. Thereafter, the coated base is heated to about 75 to 100° C. for 24 hours. The coating is found to be hard and resistant to water. It also is insoluble in conventional organic solvents.

The above process also may be performed using any of the diepoxides or polyepoxides mentioned above.

The above examples illustrate the invention as applied to the production of chloro esters using titanium tetrachloride. Corresponding bromo or fluoro or iodo esters may be prepared by using titanium tetrabromide, titanium tetrafluoride or titanium tetraiodide in lieu of titanium tetrachloride. Furthermore, the same esters may be secured by reacting halohydrins, such as butadiene monochlorohydrin, ethylene chlorohydrin, etc., with a titanium tetrahalide such as titanium tetrachloride.

Although the present invention has been described with reference to the specific details of certain embodiments thereof, it is not intended that such details shall be regarded as limitations upon the scope of the invention except insofar as included in the accompanying claims.

This application is a continuation-in-part of my copending application, Serial No. 719,930, filed January 2, 1947, now abandoned.

What is claimed:

1. A method of preparing a titanium ester which comprises contacting an epoxide compound having two 1,2-epoxy groups with a titanium compound of the group consisting of titanium tetrachloride and chlorotitanates having the formula:

$$RO_mTiCl_n$$

where R is a monovalent organic radical of a monohydric alcohol ROH produced by removing the OH group, $m$ is a small whole number not less than one nor more than two, $n$ is a small whole number not less than two nor more than three, the titanium compound and the epoxide compound being so proportioned as to supply 0.25 to 2 chlorine atoms of the titanium compound to one epoxide group of the epoxide compound.

2. The process of claim 1 wherein the epoxide compound is butadiene 1,2-diepoxide.

References Cited in the file of this patent

UNITED STATES PATENTS

| | | |
|---|---|---|
| 2,258,718 | Rothrock | Oct. 14, 1941 |
| 2,658,885 | D'Alelio | Nov. 10, 1953 |
| 2,709,174 | Rust | May 24, 1955 |

OTHER REFERENCES

Gardner et al.: Circular No. 366, pp. 327–337, Scientific Section Amer. Paint and Varn. Mfg. Assoc., July 1930.

Chemical Abstracts, vol. 39, 1945, p. 5924.

Jungnickel et al.: Organic Analysis, vol. 1, pages 127–128, 1953.